United States Patent
Vander Wielen Sabo et al.

(10) Patent No.: US 11,674,618 B2
(45) Date of Patent: Jun. 13, 2023

(54) VEHICLE AIR CONDITIONING HOSE INNER LAYER

(71) Applicant: ContiTech Techno-Chemie GmbH, Karben (DE)

(72) Inventors: Lorraine Vander Wielen Sabo, Sun Prairie, WI (US); Bradley James Haines, Sun Prairie, WI (US)

(73) Assignee: ContiTech Techno-Chemie GmbH, Karben (DE)

( * ) Notice: Subject to any disclaimer, the term of this patent is extended or adjusted under 35 U.S.C. 154(b) by 285 days.

(21) Appl. No.: 17/037,734

(22) Filed: Sep. 30, 2020

(65) Prior Publication Data
US 2022/0099222 A1   Mar. 31, 2022

(51) Int. Cl.
*F16L 11/08*   (2006.01)
*B32B 1/08*   (2006.01)
(Continued)

(52) U.S. Cl.
CPC .............. *F16L 11/085* (2013.01); *B32B 1/08* (2013.01); *B32B 5/024* (2013.01); *B32B 25/10* (2013.01);
(Continued)

(58) Field of Classification Search
CPC .. F16L 11/085; F16L 11/081; F16L 2011/047; B32B 1/08; B32B 5/024;
(Continued)

(56) References Cited

U.S. PATENT DOCUMENTS 4,774,288 A    9/1988 Ridland
4,842,024 A *  6/1989 Palinchak ............. F16L 11/085
                                               138/109

(Continued)

FOREIGN PATENT DOCUMENTS

EP     3543177 A1     9/2019
WO   2010026474 A1    3/2010

OTHER PUBLICATIONS

International Search Report dated Nov. 10, 2021 of International Application PCT/EP2021/071286 claiming priority this application.

*Primary Examiner* — Craig M Schneider
*Assistant Examiner* — David R Deal
(74) *Attorney, Agent, or Firm* — David L. Cate; Gregory Adams

(57) ABSTRACT

A refrigerant hose has an innermost tube defining a lumen therein, and the innermost tube is based on one of a hydrogenated nitrile butadiene rubber (HNBR), an HNBR containing polymer blend, or a copolymer thereof, which is cured with a phenol-formaldehyde resin. The refrigerant hose may further include an optional permeation inhibiting layer which surrounds the innermost tube when incorporated, a reinforcing layer disposed outwardly from the innermost tube and the optional permeation inhibiting layer when this layer is used, and a cover layer disposed outwardly from the reinforcing layer. The innermost tube has a volume swell percentage of 10% or less when exposed to polyolester oil or polyalkylene glycol oil for 168 hrs @ 125° C. Additionally, the innermost tube is devoid of peroxide and may further be devoid added elemental sulfur, sulfur donors and/or additives containing sulfur within their molecular structures.

20 Claims, 4 Drawing Sheets

(51) Int. Cl.
  *B32B 5/02* (2006.01)
  *B32B 25/10* (2006.01)
  *B32B 25/16* (2006.01)
  *F16L 11/04* (2006.01)
  *B60H 1/00* (2006.01)

(52) U.S. Cl.
  CPC ......... *B32B 25/16* (2013.01); *B60H 1/00571* (2013.01); *F16L 11/081* (2013.01); *B32B 2597/00* (2013.01); *F16L 2011/047* (2013.01)

(58) Field of Classification Search
  CPC ..... B32B 25/10; B32B 25/16; B32B 2597/00; B60H 1/00571
  USPC ....................................................... 138/126
  See application file for complete search history.

(56) References Cited

U.S. PATENT DOCUMENTS

| | | | |
|---|---|---|---|
| 5,362,530 A * | 11/1994 | Kitami | F16L 11/12 428/458 |
| 6,213,156 B1 * | 4/2001 | Niki | B32B 27/32 138/125 |
| 6,237,641 B1 * | 5/2001 | Niki | B60H 1/00571 138/143 |
| 7,478,654 B2 | 1/2009 | Haines | |
| 10,364,100 B2 | 7/2019 | Maguire et al. | |
| 10,442,918 B2 | 10/2019 | Inoue et al. | |
| 2004/0040609 A1 | 3/2004 | Oishi et al. | |
| 2007/0048475 A1 * | 3/2007 | Haines | F16L 11/081 428/36.91 |
| 2008/0139709 A1 | 6/2008 | Piccirilli et al. | |
| 2010/0300571 A1 | 12/2010 | Miller et al. | |
| 2011/0155359 A1 * | 6/2011 | Doshi | B32B 1/08 165/180 |
| 2011/0226375 A1 * | 9/2011 | Harris | B32B 25/08 138/137 |
| 2012/0090720 A1 * | 4/2012 | Burrowes | B32B 5/26 138/124 |
| 2014/0116562 A1 | 5/2014 | Haines et al. | |
| 2015/0075665 A1 * | 3/2015 | Henry | F16L 11/045 138/138 |
| 2017/0350541 A1 * | 12/2017 | Henry | B32B 27/12 |
| 2018/0045343 A1 * | 2/2018 | Burrowes | B32B 5/02 |
| 2018/0313489 A1 * | 11/2018 | D'hondt | B32B 1/08 |
| 2019/0291958 A1 | 9/2019 | Henning et al. | |
| 2020/0079001 A1 | 3/2020 | Haines | |
| 2020/0080668 A1 | 3/2020 | Haines et al. | |
| 2022/0213989 A1 * | 7/2022 | Hou | B60H 1/00571 |

* cited by examiner

VEHICLE AIR CONDITIONING HOSE INNER LAYER

FIELD

The field to which the disclosure generally relates is a hose suitable for use in refrigerant systems such as vehicle, industrial, and residential refrigerant systems, such as automotive air conditioning systems. The hose has an inner layer with improved properties used in air conditioning systems.

BACKGROUND

This section provides background information to facilitate a better understanding of the various aspects of the disclosure. It should be understood that the statements in this section of this document are to be read in this light, and not as admissions of prior art.

Hoses are used for transporting refrigerants in vehicle air conditioning (AC) systems, as well as industrial and residential refrigerant systems. Such hoses serve the purpose of joining the principal operating components of the refrigerating device. The hoses are typically designed to have good flexibility, high strength, the ability to bend to small radii without kinking, and to maintain impermeability to the fluids resident therein.

Recent changes in vehicle air conditioning systems necessitate changes to traditional compounds used in forming certain layers of vehicle air conditioning hoses, and in particular, the layer at the inner surface of the hose which is in contact with the refrigerant and compressor oil resident and contained within the hose. In one instance, the movement towards refrigerants with low global warming potentials (GWP) such as 2,3,3,3-tetrafluoropropene, known commercially as R1234yf, presents challenges in selecting materials for layers of the hose. Some traditional hose inner layers can decrease the effectiveness of these new refrigerants. Rubber materials with certain polymerization initiators including peroxides can lead to the polymerization of 2,3,3,3-tetrafluoropropene.

Additionally, with the hybridization and electrification of vehicles there has been a movement away from traditional polyalkylene glycol (PAG) AC system compressor oils to polyester (POE) compressor oils, along with a demand for increased service temperatures. POE oils, however, can cause increased swelling and softening of traditional vehicle AC hose layer compounds, such as butyls, halobutyls, and chloroprenes. Furthermore, these traditional AC hose layer compounds may not be designed for use at increased service temperatures.

Another consideration is the emerging use of nickel in the automotive AC compressors. This requires avoidance of sulfur cure systems, sulfur donors, and other sulfur-containing accelerators and additives due to corrosion of nickel. Elemental sulfur can provide crosslinks that contain 3 to 8 sulfur atoms. These crosslinks have lower bond energy than the carbon to carbon bonds, and those crosslinks with the greatest the number of sulfur atoms will provide the weakest bonds strengths. These weaker sulfur to sulfur bonds, when exposed to heat or stress, create an opportunity for bond breakage. Any unreacted sulfur, along with this bond breakage could provide sulfur that could lead to sulfur corrosion in AC compressors when nickel and other materials with lower corrosion resistance are used. To reduce the number of sulfur crosslinks, the quantity of elemental sulfur can be reduced or eliminated and sulfur containing accelerators can be used. While the number of sulfur atoms within crosslinks will be reduced as compared to rubber conventionally cured with elemental sulfur, any sulfur-to-carbon or sulfur-to-sulfur bonds will have more susceptibility to bond breakage than carbon-to-carbon bonds when exposed to heat or stress. Any unreacted portions of sulfur accelerators or sulfur donors will also be available to corrode easily corroded AC compressor components such as nickel. Typically, the need to avoid sulfur or the demand for increased service temperatures will drive material selection towards a peroxide cured elastomer, which presents issues described above.

Thus, there is an ongoing need for air conditioning hoses having certain layers constructed of material layers which overcome the issues described above, and such need is met, at least in part, with embodiments according to the following disclosure.

SUMMARY

This section provides a general summary of the disclosure, and is not a necessarily a comprehensive disclosure of its full scope or all of its features.

In a first aspect of the disclosure, a refrigerant hose has an innermost tube defining a lumen therein, and the innermost tube one of a hydrogenated nitrile butadiene rubber (HNBR), an HNBR containing polymer blend, or a copolymer thereof, which is cured with a phenol-formaldehyde resin. The refrigerant hose may further include an optional permeation inhibiting layer which surrounds the innermost tube when incorporated, a reinforcing layer disposed outwardly from the innermost tube and the optional permeation inhibiting layer when this layer is used, and a cover layer disposed outwardly from the reinforcing layer. The innermost tube has a volume swell percentage of 10% or less when exposed to polyolester oil or polyalkylene glycol oil for 168 hrs @ 125° C. Additionally, the innermost tube is devoid of peroxide and may further be devoid added elemental sulfur, sulfur donors and/or additives containing sulfur within their molecular structures. Refrigerant hoses may further include a tie layer disposed between the permeation inhibiting layer and the reinforcing layer when a permeation barrier layer is incorporated.

In some aspects of the disclosure, molecules of 2,3,3,3-tetrafluoropropene or 1,1,1,2-tetrafluoroethane refrigerant are resident in the lumen, and the lumen may be devoid of polymerized 2,3,3,3-tetrafluoropropene molecules.

The cover layer may be based on any suitable material, such as, but not limited to, butyl (IIR), halobutyl (CIIR/BIIR), HNBR(HNBR), brominated isobutylene paramethyl-styrene (BIMS), ethylene-propylene-diene monomer rubber, or the like. In some aspects, the reinforcement layer may be based on polyester material, such as a polyethylene terephthalat, or other suitable polyester. The reinforcement layer may be material which includes glass fibers, cotton fibers, polyester fibers, polyaramid fibers, aramid fibers, or suitable mixtures thereof.

According to some aspects of the disclosure, the phenol-formaldehyde resin may be a brominated octylphenol-formaldehyde resin, an ocytlphenol-formaldehyde resin and a Lewis acid activator (halogen) added to the composition in the form of a halogenated organic compound, an octylphenol-formaldehyde resin and a Lewis acid activator (halogen) added to the composition in the form of a metal halide, or a phenol-formaldehyde and a halogenated organic compound added to provide a Lewis Acid activator.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
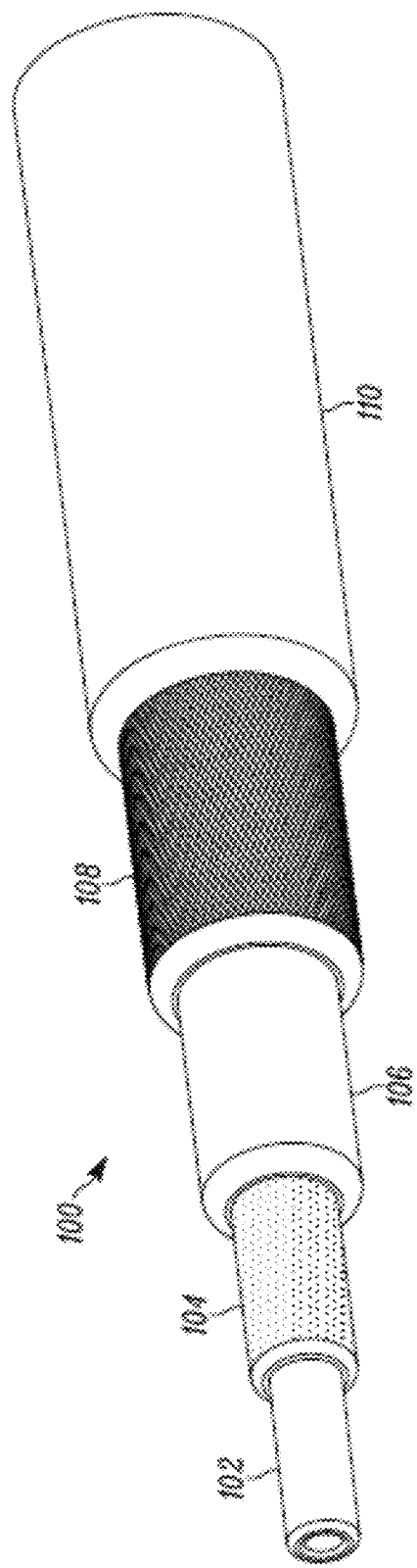
FIG. 1 illustrates a barrier braided hose in a cut away perspective view, in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Hose embodiments according to the disclosure generally include a rubber hose having an innermost tube, at least one reinforcement layer, and an outer cover. The hose embodiments also include barrier style hose which generally includes a barrier layer, at least one reinforcement layer, optional reinforcement layer or layers, optional tie layer or layers, an outer cover, and an innermost tube.

The innermost tube is formed from an elastomeric material formed from a resin cured hydrogenated nitrile butadiene rubber (HNBR), HNBR within a polymer blend, or copolymer thereof. The resin curing system is based upon the use of phenol formaldehyde resins that react with the small amount of unsaturated points remaining in a slightly less than fully saturated HNBR to form crosslinks. These phenol formaldehyde resins could be added to the composition directly, or could be formed in-situ from phenol and phenol derivatives in reactions with various aldehydes. Examples of phenol derivatives include, but are not limited to, bisphenols, phenols, cresols, resorcinol, and hexamethylene tetramine (HMT). Phenol-formaldehyde resins created by the alkylation of phenols, or resols, and resorcinol novolak resin or resorcinol phenol novalak resins are some nonlimiting examples suited for crosslinking elastomers. A commercial example is brominated octylphenol formaldehyde resin SP-1055 available from SI Group.

To catalyze the cure reaction of phenol formaldehyde resins, the presence of a Lewis acid activator, such as a halogenated species, is used. This halogenated species may be part of the resin itself, which is the case of the previously mentioned brominated octylphenol formaldehyde resin. The halogen is also commonly added to the composition containing non-halogenated phenol formaldehyde resins in the form of small amounts of halogenated organic compounds such as, but not limited to, chloroprene or halobutyls. Halogen could also be added as one of many suitable metal halide materials including but not limited to, stannous chlorides (i.e. $SnCl_2$).

It is observed by the inventors that by using such a resin cured HNBR innermost tube, the effectiveness of the refrigerants is improved by avoiding use of peroxide cure systems for the innermost tube, since residual peroxides can lead to the crosslinking of the refrigerant. It is observed by the inventors that by using such a resin cured HNBR innermost tube, the compressor integrity is improved by avoiding the use of sulfur which is known to corrode nickel in AC compressors.

With regards to the barrier layer, any suitable material may be used to form the layer when constructing a barrier style hose. A barrier layer is not used in the all rubber construction. Some suitable, yet non-limiting examples of barrier materials includes polyamides such as PA11, PA46, PA6, PA66, PA6,66, PA66,6, PA69, PA610, PA612, PA1010, PA1212, PA4T, PA6T, PA9T, and PA10T, thermoplastic polyester elastomers based upon polyether-ester block copolymers, such as those supplied under tradename Hytrel®; or thermoplastic elastomers comprised of polyamide and polyether backbone blocks, such as those supplied under tradename Pebax®.

When used, the tie layer(s) is typically comprised of any suitable thermoset materials including, but not limited to, polybutadiene (BR), copolymers of butadiene and acrylonitrile (NBR), butyl rubber (IIR), chlorobutyl rubber (CIIR), bromobutyl rubber (BIIR), copolymers of butadiene and styrene (SBR), polychloroprene (CR), ethylene propylene rubber (EPM), or ethylene propene diene (EPDM). In one embodiment, the base stock material for the layer is EPDM.

The reinforcing layer may be based on a material formed by braiding, spiraling, knitting, or helical knitting of yarn. The reinforcing layer may be based on a material which is woven or non-woven. The material may be selected from conventional hose reinforcing yarns, such as glass, cotton, polyester, or aramid fibers, or a blend of any of these fibers. In some aspects, the reinforcing layer in the hose is a polyester or aramid fabric, or even a blend of polyethylene terephthalate yarn and polyethylene naphthalate yarn to form the fabric.

The cover layer employed in embodiments of this disclosure is selected from rubbers including, but not limited to, the following rubbers, and blends or copolymers thereof, selected from ethylene propylene diene rubber (EPDM), ethylene propylene rubber (EPR), butyl rubber (IIR), chlorobutyl rubber (CIIR), bromobutyl rubber (BIIR), chloroprene rubber (CR), nitrile rubber (NBR), chlorosulfonated polyethylene rubber (CSM), epichlorohydrine rubber (ECO), acrylic rubber (ACM), chloroprene rubber (CR), ethylene-acrylic elastomer (AEM), or chlorinated polyethylene (CPE), and the like. In one embodiment, the base stock for the cover layer is EPDM.

With the exception of the innermost tube layer, the various material components utilized in the hose embodiments of this disclosure can be cured with conventional curatives including, but not limited to, peroxide, sulfur, sulfur donor curatives, amine curatives, resin cure system, metal oxide curatives, and the like. For example peroxides such as dicumyl peroxide, α-α-bis(t-butylperoxide)diisopropylbenzene, benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, and n-butyl 4,4-bis(t-butylperoxy)valerate can be employed in curing the rubber components of the hose. From 1 to about 10 parts of peroxide are generally utilized based on 100 parts of base polymer. Peroxides are preferred as the curative since they are less sensitive to premature crosslinking (scorch). Sulfur/sulfur donor curatives are also commonly used. A few examples of the many sulfur containing accelerators and sulfur donors available for rubber cure systems include tetramethyl thiuram disulfide, 4,4'-dithiodimorpholine, dipentamethylene thiuram tetrasulfide, thiocarbamyl sulfenamide, mercaptobenzothiazole, zinc dimethyl carbamate, dibenzothiazole disulfide, and N-cyclohexyl-2-benzothiazole sulfonamide.

The rubber components employed in the hose of this invention can also contain various additives in conventional or suitable amounts. Such additives may include, and are not limited to retardants to prevent an unduly quick cure, antioxidants, processing aids, reinforcing agents and fillers, such as carbon black, silica, coupling agents, dispersants, adhesion promotors and the like.

Now referencing FIGS. 1 through 4 which depict some hose embodiments in accordance with the disclosure. FIG. 1 illustrates a barrier braided hose 100, in a cut away perspective view. Hose 100 includes an innermost tube 102 which is surrounded by a permeation inhibiting layer 104. Disposed adjacent permeation inhibiting layer 104 is a tie layer 106 which has a reinforcing layer 108 disposed outwardly therefrom. Cover layer 110 is the outermost layer of hose 100.

Figure 2:
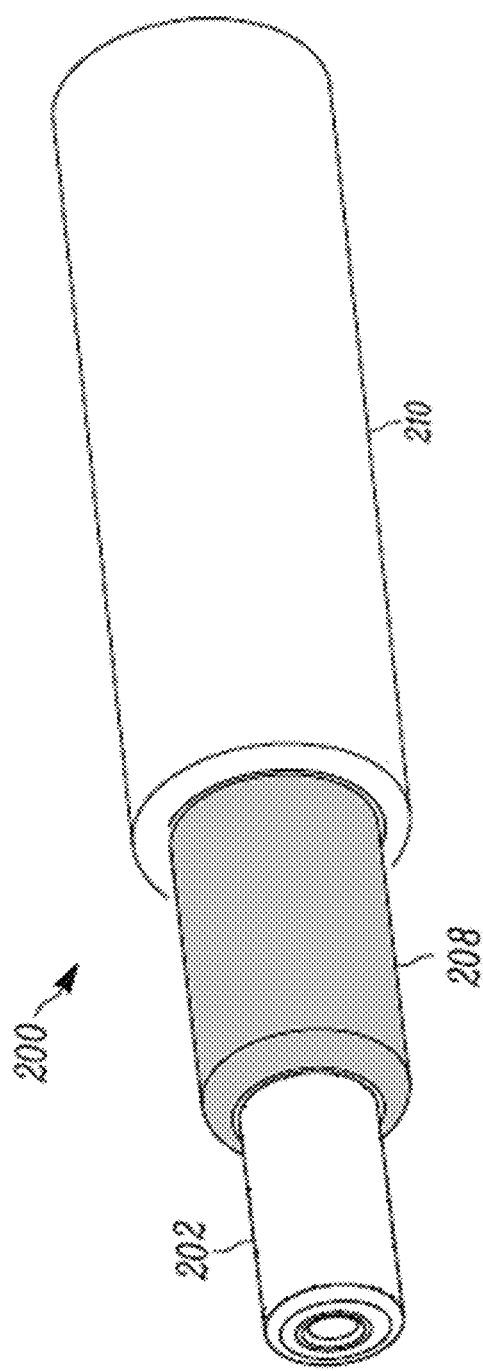
FIG. 2 depicts an all rubber braided hose in a cut away perspective view, in accordance with the disclosure.

With reference to FIG. 2, which depicts an all rubber braided hose 200, in a cut away perspective view, hose 200 includes an innermost layer 202 surrounded by a reinforcing layer 208, and cover layer 210 is the outermost layer of hose 200.

Figure 3:
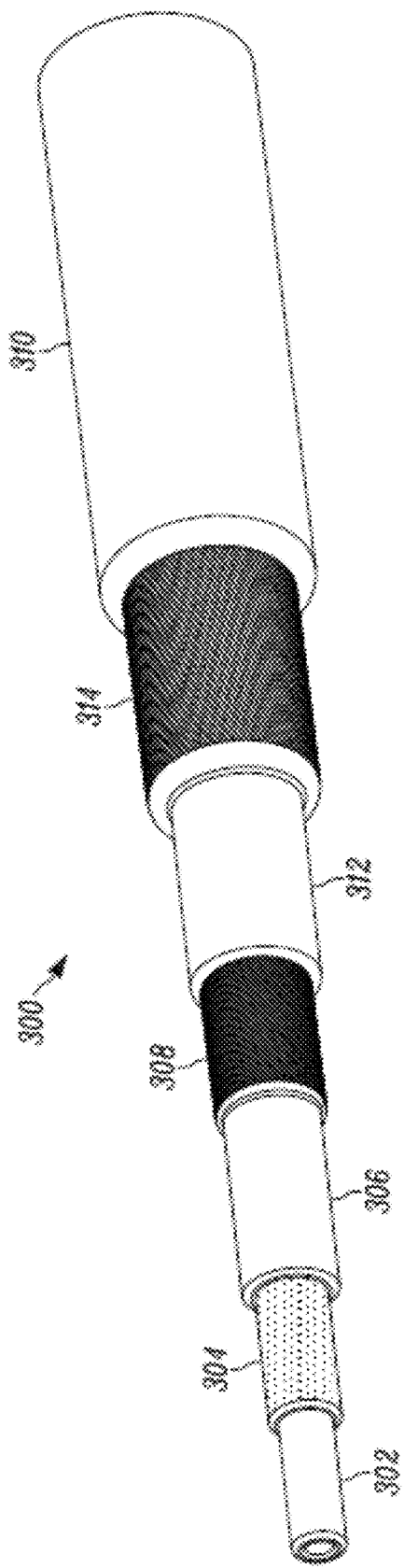
FIG. 3 illustrates a spiral barrier hose in a cut away perspective view, in accordance with the disclosure.

Now referencing FIG. 3 which illustrates a spiral barrier hose 300, in a cut away perspective view. Hose 300 includes an innermost elastomer tube 302 which is surrounded by a permeation inhibiting layer 304. Adjacent to permeation inhibiting layer 304 is a tie layer 306 which has a spiral reinforcing layer 308 disposed outwardly therefrom. Surrounding the spiral reinforcing layer 308 is a second tie layer 312 which has second spiral reinforcing layer 314 disposed thereupon. Cover layer 310 is the outermost layer of hose 300.

Figure 4:
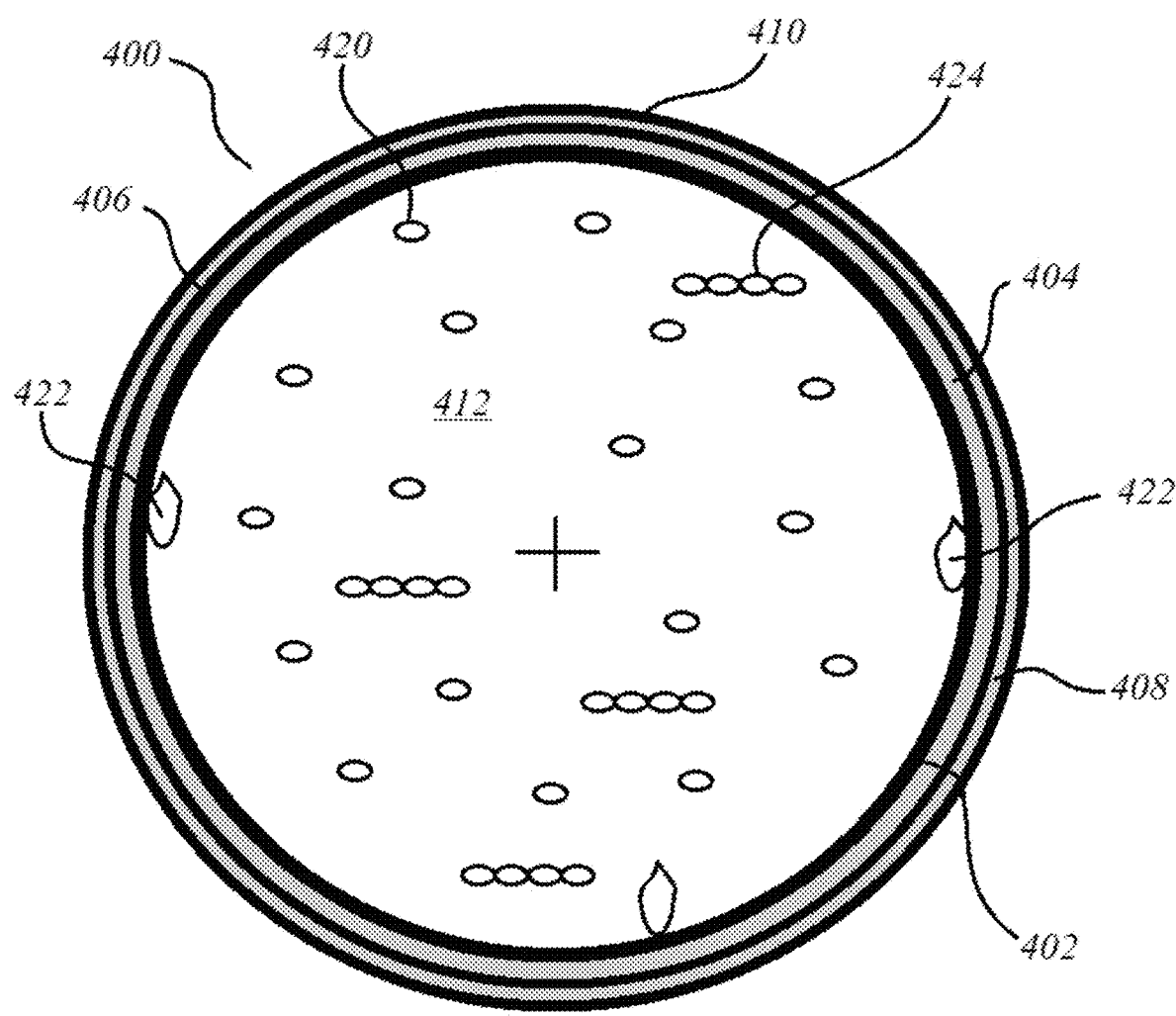
FIG. 4 illustrates a cross-section of a hose with refrigerant and oil contained therein.

Now referencing FIG. 4 which illustrates a cross-section of a barrier hose according to an embodiment of the disclosure with refrigerant and oil resident and contained therein. The cross-section is taken in a plane parallel the longitudinal centerline of the hose which is represented by +. Also, for purposes of illustrating the concept, as presented, this depiction presented is linearly dimensionless. Hose 400 includes an innermost tube 402 which, in some aspects, is surrounded by an optional permeation inhibiting layer 404, and disposed adjacent permeation inhibiting layer 404 is an optional tie layer 406. A reinforcing layer 408 disposed outwardly therefrom. Cover layer 410 is the outermost layer of hose 400. Resident within a lumen 412 defined within innermost tube 402 are molecules 420 of 2,3,3,3-tetrafluoropropene refrigerant and POE oil droplets 422. As innermost tube 402 is formed from a reactive phenol-formaldehyde resin cured hydrogenated nitrile butadiene rubber (HNBR), the 2,3,3,3-tetrafluoropropene refrigerant is stabilized, swelling due to contact of the inner wall of innermost tube 402 with POE oil is minimized, or essentially eliminated, and formation of polymerized 2,3,3,3-tetrafluoropropene molecules 424 is avoided. As such, innermost tube 402 is devoid of peroxide, as well as devoid of any added sulfur or sulfur containing materials, and lumen 412 is devoid of polymerized 2,3,3,3-tetrafluoropropene molecules 424.

EXAMPLES

Some embodiments of the disclosure illustrated by the following examples that are merely for the purpose of illustration and are not to be regarded as limiting the scope of the disclosure, or the manner in which it can be practiced. Unless specifically indicated otherwise, parts (phr) are given by weight based upon the amount of HNBR resin. In this experiment, rubber formulations, to be used to for innermost layers of AC hoses, were prepared, cured and tested for physical properties indicated.

TABLE 1

| Ingredient | Ex. 1 | Ex. 2 | Ex. 3 |
|---|---|---|---|
| HNBR, phr | 100 | 100 | 100 |
| Carbon Black, phr | 87 | 39 | 39 |
| Zinc 2-Mercaptotoluimidazole, phr | 1.7 | — | — |
| Zinc 2-Mercaptotoluimidazole & N,N' bis beta (3,5 di-t-butyl-4-hydroxyphenyl)-propionyl hydrazine, phr | — | 2.9 | — |
| Zinc 2-Mercaptotoluimidazole & 2,2,4-trimethyl-1,2-dihydroquinoline, phr | — | — | 2.5 |
| Trioctyl trimellitate, phr | 5 | 5 | 5 |
| Silica, phr | 0 | 15 | 15 |
| Carbon black & bifunctional polysulfidic organosilanes (bis(3-triethoxysilypropl) tetrasulfide), phr | — | 3 | — |

TABLE 1-continued

| Ingredient | Ex. 1 | Ex. 2 | Ex. 3 |
|---|---|---|---|
| Vinyl silane on synthetic calcium silicate, phr | — | — | 1 |
| Phenol-formaldehyde resin, phr | 10 | 12 | 12 |
| Stearic Acid, phr | 1 | 1.2 | 1.2 |
| Dispersant/Processing Aid, phr | 0 | 4 | 4 |
| Total Parts | 204.7 | 182.1 | 179.7 |

The cured rubber formulations were determined to have the physical properties provided in Table 2.

TABLE 2

| Test | Ex. 1 | Ex. 2 | Ex. 3 |
|---|---|---|---|
| Original Physical Properties | | | |
| Tensile, MPa | 15 | 17 | 16 |
| Elongation, % | 366 | 443 | 410 |
| Mod 100, MPa | 4.1 | 3.7 | 4.4 |
| Hardness, Durometer Shore A | 70 | 75 | 76 |
| Tear Test - Original | | | |
| Die C Tear, N/mm | 29 | 40 | 36 |
| Compression Set, 22 @ 135° C. Set, % | 36 | 54 | 44 |
| Fluid Aged Properties, 168 hrs @ 125° C., POE Oil (ND11) | | | |
| Tensile Ret, % | 107 | 97 | 93 |
| Elongation Ret, % | 78 | 87 | 94 |
| Mod 100 Ret, % | 109 | 103 | 102 |
| Hardness Change, Pts | −5 | −6 | −8 |
| Volume Swell, % | 9 | 9 | 10 |
| Fluid Aged Properties, 168 hrs @ 125° C., PAG Oil (ND12) | | | |
| Tensile Ret, % | 98 | 86 | 89 |
| Elongation Ret, % | 81 | 102 | 97 |
| Mod 100 Ret, % | 94 | 95 | 99 |
| Hardness Change, Pts | −4 | −5 | −4 |
| Volume Swell, % | 3 | 1 | 0 |

The above examples illustrate the innermost tube forming rubber materials have sufficient properties for such a layer, as well as having a volume swell percentage of 10% or less when exposed to polyolester oil for 168 hrs @ 125° C. and a hardness change of less than 10 points Shore A Durometer The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE NUMERALS (PART OF THE DESCRIPTION)

100 Barrier braided hose
200 All rubber hose
300 Spiral barrier hose
400 Hose
102, 202, 302, 402 Innermost tube
104, 304, 404 Permeation inhibiting layer
106, 306, 312, 406 Tie layer
108, 208, 408 Braided reinforcing layer
308, 314 Spiral reinforcing layer
110, 210, 310, 410 Cover layer
412 Lumen
420 Molecules of 2,3,3,3-tetrafluoropropene refrigerant or 1,1,1,2-tetrafluoroethane refrigerant
422 POE or PAG oil droplets
424 Polymerized 2,3,3,3-tetrafluoropropene

What is claimed is:
1. A refrigerant hose comprising:
(a) an innermost tube defining a lumen therein, the innermost tube comprising a hydrogenated nitrile butadiene rubber (HNBR), an HNBR containing polymer blend, or a copolymer thereof cured with a phenol-formaldehyde resin;
(b) an optional permeation inhibiting layer which surrounds the innermost tube;

(c) a reinforcing layer disposed outwardly from the innermost tube and the optional permeation inhibiting layer; and, (d) a cover layer disposed outwardly from the reinforcing layer;

wherein the innermost tube has a volume swell percentage of 10% or less when exposed to polyolester oil or polyalkylene glycol oil for 168 hrs @ 125° C.; and, wherein the innermost tube is devoid of peroxide, and devoid of added elemental sulfur, sulfur donors, or additives containing sulfur within the additives' molecular structure.

2. The refrigerant hose according to claim 1 further comprising a tie layer disposed between the optional permeation inhibiting layer and the reinforcing layer when the optional permeation barrier layer is incorporated into the refrigerant hose.

3. The refrigerant hose according to claim 1 further comprising molecules of 2,3,3,3-tetrafluoropropene in the lumen.

4. The refrigerant hose according to claim 3, wherein the lumen is devoid of polymerized 2,3,3,3-tetrafluoropropene molecules.

5. The refrigerant hose according to claim 1, wherein the cover layer is comprised of butyl (IIR), halobutyl (CIIR/BIIR), HNBR(HNBR), brominated isobutylene paramethylstyrene (BIMS) or ethylene-propylene-diene monomer rubber (EPDM).

6. The refrigerant hose according to claim 1, wherein the reinforcement layer is a woven polyester fabric.

7. The refrigerant hose according to claim 6, wherein the woven polyester fabric is a woven polyethylene terephthalate fabric.

8. The refrigerant hose according to claim 1, wherein the reinforcement layer is a woven fabric which is comprised of glass fibers, cotton fibers, polyester fibers, polyaramid fibers, or aramid fibers.

9. The refrigerant hose according to claim 1, wherein the reinforcing layer is a spiral reinforcing layer, and wherein the refrigerant hose further comprises a second tie layer surrounding the spiral reinforcing layer, and a second spiral reinforcing layer disposed between the cover layer and the second tie layer.

10. The refrigerant hose according to claim 1, wherein the phenol-formaldehyde resin is brominated octylphenol-formaldehyde resin.

11. The refrigerant hose according to claim 1, wherein the phenol-formaldehyde resin is an ocytlphenol-formaldehyde resin with a Lewis acid activator (halogen) added as a halogenated organic compound.

12. The refrigerant hose according to claim 1, wherein the phenol-formaldehyde resin is an octylphenol-formaldehyde resin with a Lewis acid activator (halogen) added as a metal halide.

13. The refrigerant hose according to claim 1, wherein a halogenated organic compound is added to provide a Lewis Acid activator.

14. A refrigerant hose comprising:

(a) an innermost tube defining a lumen therein, the innermost tube comprising a hydrogenated nitrile butadiene rubber (HNBR), an HNBR containing polymer blend, or a copolymer thereof cured with a phenol-formaldehyde resin;

(b) an optional permeation inhibiting layer which surrounds the innermost tube;

(c) a reinforcing layer disposed outwardly from the innermost tube or the permeation inhibiting layer if this layer is used; and, (d) a cover layer disposed outwardly from the reinforcing layer;

wherein the innermost tube has a volume swell percentage of 10% or less when exposed to polyolester oil or polyalkylene glycol oil for 168 hrs @ 125° C.; and, wherein the innermost tube is devoid of peroxide.

15. The refrigerant hose according to claim 14 further comprising a tie layer disposed between the permeation inhibiting layer and the reinforcing layer when a permeation barrier layer is used.

16. The refrigerant hose according to claim 14 further comprising molecules of 2,3,3,3-tetrafluoropropene refrigerant in the lumen, and wherein the lumen is devoid of polymerized 2,3,3,3-tetrafluoropropene molecules.

17. The refrigerant hose according to claim 14, wherein the phenol-formaldehyde resin is brominated octylphenol-formaldehyde resin.

18. The refrigerant hose according to claim 14, wherein the phenol-formaldehyde resin is an ocytlphenol-formaldehyde resin and a Lewis acid activator (halogen) is added to the composition in the form of a halogenated organic compound.

19. The refrigerant hose according to claim 14, wherein the phenol-formaldehyde resin is an octylphenol-formaldehyde resin and a Lewis acid activator (halogen) is added to the composition in the form of a metal halide.

20. The refrigerant hose according to claim 14, wherein the phenol-formaldehyde and a halogenated organic compound is added to provide a Lewis Acid activator.

* * * * *